United States Patent
Berry

(10) Patent No.: US 8,935,697 B2
(45) Date of Patent: Jan. 13, 2015

(54) SUSPENSION AND/OR THROTTLING OF PROCESSES FOR CONNECTED STANDBY

(75) Inventor: Jon Berry, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/207,118

(22) Filed: Aug. 10, 2011

(65) Prior Publication Data

US 2013/0042246 A1 Feb. 14, 2013

(51) Int. Cl.
*G06F 9/46* (2006.01)
*G06F 1/32* (2006.01)
*G06F 9/48* (2006.01)
*G06F 9/44* (2006.01)

(52) U.S. Cl.
CPC .......... *G06F 1/3206* (2013.01); *Y02B 60/144* (2013.01); *Y02B 60/32* (2013.01); *G06F 9/4893* (2013.01); *G06F 1/324* (2013.01); *G06F 1/3209* (2013.01); *G06F 1/329* (2013.01); *G06F 9/4418* (2013.01); *G06F 9/4881* (2013.01)
USPC .......................................................... 718/102

(58) Field of Classification Search
CPC .............................. G06F 9/4881; G06F 1/3287
USPC ........................................ 718/102; 713/323
See application file for complete search history.

(56) References Cited

U.S. PATENT DOCUMENTS

| | | | |
|---|---|---|---|
| 5,511,203 A * | 4/1996 | Wisor et al. | 713/322 |
| 6,148,408 A | 11/2000 | Shimoda | |
| 6,260,150 B1 | 7/2001 | Diepstraten | |
| 6,834,386 B1 | 12/2004 | Douceur | |
| 7,082,542 B2 * | 7/2006 | Cooper | 713/320 |

(Continued)

FOREIGN PATENT DOCUMENTS

| | | |
|---|---|---|
| KR | 1020060064438 A | 6/2006 |
| KR | 1020080060649 A | 7/2008 |
| KR | 1020100094857 A | 8/2010 |

OTHER PUBLICATIONS

International Search Report cited in PCT Application No. PCT/US2011/055452 dated Jul. 30, 2012, 11 pgs.

(Continued)

*Primary Examiner* — Camquy Truong
(74) *Attorney, Agent, or Firm* — John Jardine; Kate Drakos; Micky Minhas

(57) ABSTRACT

One or more techniques and/or systems are provided for assigning power management classifications to a process, transitioning a computing environment into a connected standby state based upon power management classifications assigned to processes, and transitioning the computing environment from the connected standby state to an execution state. That is, power management classifications, such as exempt, throttle, and/or suspend, may be assigned to processes based upon various factors, such as whether a process provides desired functionality and/or whether the process provides functionality relied upon for basic operation of the computing environment. In this way, the computing environment may be transitioned into a low power connected standby state that may continue executing desired functionality, while reducing power consumption by suspending and/or throttling other functionality. Because some functionality may still execute, the computing environment may transition into the execution state in a responsive manner to quickly provide a user with up-to-date information.

20 Claims, 9 Drawing Sheets

(56) References Cited

U.S. PATENT DOCUMENTS

| | | | |
|---|---|---|---|
| 7,526,585 | B2 | 4/2009 | Jeong |
| 7,584,376 | B2 | 9/2009 | Finkelstein |
| 7,702,733 | B2 | 4/2010 | Fleck et al. |
| 7,721,331 | B1 * | 5/2010 | Rowe .............................. 726/22 |
| 7,853,812 | B2 | 12/2010 | McBrearty |
| 8,209,701 | B1 * | 6/2012 | Roytman et al. .............. 718/106 |
| 2003/0051183 | A1 | 3/2003 | Lo et al. |
| 2003/0214481 | A1 | 11/2003 | Xiong |
| 2005/0066209 | A1 | 3/2005 | Kee et al. |
| 2007/0121665 | A1 | 5/2007 | Ergan et al. |
| 2007/0245163 | A1 | 10/2007 | Lu |
| 2008/0072086 | A1 | 3/2008 | Kim |
| 2009/0113444 | A1 | 4/2009 | Hackborn et al. |
| 2009/0307696 | A1 * | 12/2009 | Vals et al. ..................... 718/102 |
| 2009/0325563 | A1 | 12/2009 | Horodezky et al. |
| 2010/0013551 | A1 | 1/2010 | Reams |
| 2010/0023788 | A1 | 1/2010 | Scott |
| 2010/0185882 | A1 | 7/2010 | Arnold et al. |
| 2011/0080349 | A1 | 4/2011 | Holbein et al. |

OTHER PUBLICATIONS

International Search Report cited in PCT Application No. PCT/US2011/055464 dated Jul. 30, 2012, 11 pgs.

International Search Report cited in PCT Application No. PCT/US2011/055472 dated Jul. 31, 2012, 9 pgs.

"Application's Life Cycle in iOS4", Adi Saxena, Oct. 29, 2010, reprinted from the Internet at: codeproject.com/Articles/121681/Application-s-Life-Cycle-in-iOS4, 3 pgs.

Chang; et al., "Implementation and Optimization of DSP Suspend Resume on Dual-Core SOC", Published Date: May 25-27, 2009, pp. 185-190, Proceedings: ICESS s09, ieeexplore.ieee.org/stamp/stamp.jsp?tp=&arnumber=5066647.

Non-Final Office Action cited in U.S. Appl. No. 13/616,204 dated Jan. 11, 2013, 19 pgs.

Rely Non-Final Office Action cited in U.S. Appl. No. 13/616,204 dated Apr. 8, 2013, 13 pgs.

Final Office Action cited in U.S. Appl. No. 13/616,204 dated Jul. 3, 2013, 21 pgs.

Reply Final Office Action cited in U.S. Appl. No. 13/616,204 dated Dec. 3, 2013, 15 pgs.

Non-Final Office Action cited in U.S. Appl. No. 13/207,138 dated Mar. 27, 2013, 40 pgs.

Reply Non-Final Office Action cited in U.S. Appl. No. 13/207,138 dated Jun. 27, 2013, 12 pgs.

Final Office Action cited in U.S. Appl. No. 13/207,138 dated Aug. 29, 2013, 22 pgs.

Reply Final Office Action cited in U.S. Appl. No. 13/207,138 dated Dec. 30, 2013, 12 pgs.

Non-Final Office Action cited in U.S. Appl. No. 13/207,167 dated May 6, 2013, 26 pgs.

Reply Non-Final Office Action cited in U.S. Appl. No. 13/207,167 dated Aug. 6, 2013, 11 pgs.

Notice of Allowance cited in U.S. Appl. No. 13/207,167 dated Sep. 24, 2013, 34 pgs.

* cited by examiner

SUSPENSION AND/OR THROTTLING OF PROCESSES FOR CONNECTED STANDBY

BACKGROUND

Many computing devices, such as desktops, laptops, smart phones, and tablets, are developed around conserving power consumption and/or extending battery life. For example, a laptop screen may be dimmed if a laptop has been idle for a set period of time. Power conservation may provide extended operating and/or time between (re)charging a computing device, which may be desirable and convenient for a user. Unfortunately, many applications may not comprise power conservation functionality, and may significantly reduce power conservation and/or have poor power "hygiene", by not causing hardware to exit high power states and/or by utilizing resources when the computing device could otherwise be idle (e.g., an idle application may needlessly consume processor cycles).

Many power conservation techniques may degrade a user experience with a computing device because transitioning the computing device from a low powered state, such as a hibernation/sleep state, to an execution state may require user input, take a relatively long amount of time and/or provide stale data until refreshed. For example, a user may periodically interact with a laptop while at home. To conserve battery life of the laptop, a hibernation/sleep policy may be in place, where the laptop may be placed into a suspended state if the user does not interact with the laptop for a set period of time, such as 10 minutes. Unfortunately, conventional hibernation/sleep policies may take a significant amount of time (e.g., minutes) to reawaken the computing system into an up-to-date execution state useable by the user because a substantial portion of the computing system may have been suspended (e.g., a processer may stop execution, an operating system kernel may be suspended, etc.). Waiting for the computing system to fully reawaken may provide a less satisfying user experience.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for assigning a power management classification to one or more processes associated with a computing environment, transitioning the computing environment into a connected standby state based upon power management classifications assigned to processes, and transitioning the computing environment from a connected standby state to an execution state are disclosed herein.

It may be appreciated that in one example, an execution state of a computing environment may correspond to a general operating state of the computing environment. While in the execution state, processes may be created and executed, and the computing environment may be responsive to user input (e.g., a user may interact with a word processor and/or other applications while the computing environment is in the execution state). It may be appreciated that in one example, a connected standby state may correspond to a low power consumption state of the computing environment, which may nevertheless provide an always-on/always-connected experience. While in the connected standby state, particular processes may be allowed to execute, while other processes may be either suspended into a non-executing suspended state and/or throttled between the execution state and the non-executing suspended state to reduce power consumption. For example, while in the connected standby state, a computing environment may allow execution and/or throttled execution of critical system processes (e.g., networking functionality processes, particular core kernel processes, hardware functionality processes, messaging functionality processes, etc.), power savvy applications (e.g., applications with managed lifecycles), and/or other processes that may provide desired connectivity (e.g., simple email functionality processes) so that the computing device may provide a responsive and up-to-date experience for a user when transitioning from the connected standby state to the execution state (e.g., the computing environment may awaken quickly (e.g., within seconds), and may provide the user with up-to-date email, information, and/or connectivity). However, to conserve power, non-critical system services (e.g., a print spooler, system update checker, etc.) and/or user applications (e.g., a word processor) may be throttled and/or suspended.

In one example of assigning a power management classification to a process, a process may be identified (e.g., a newly created process). The process may be assigned a power management classification, such as an exempt classification, a suspend classification, or a throttling classification based upon various factors (e.g., how critical is the process for basic functionality, is the process associated with a system service, is the process associated with a user application, can the process be throttled without causing a failure, can the process be suspended without losing desired functionality and/or causing a failure, etc.). If a lifecycle of the process is managed by the process and/or a lifecycle management component, then the process may be assigned the exempt classification because the process may already be associated with power conservation functionality (e.g., assigning and implementing the power management classification to the process may be redundant and/or may cause a failure of the process). If the process can be suspended without a computing system failure (e.g., suspension of a photo viewing process may not cause a failure of the computing environment and/or a failure of a photo viewing application) and limited runtime functionality associated with the process is not desired (e.g., photo viewing functionality may not be desired while the computing environment is within a connected standby state), then a suspend classification may be assigned to the process.

If the process can be throttled without the computing system failure and limited runtime functionality associated with the process is desired (e.g., a user may desire to receive message notifications while the computing environment is within the connected standby state), then a throttling classification may be assigned to the process. If the process cannot be throttled without the computing system failure and limited runtime functionality associated with the process is desired, then the exempt classification may be assigned to the process. In this way, the power management classification may be assigned to the process. In one example, the power management classification may be utilized when transitioning the computing environment into a connected standby state. For example, exempt processes may be allowed to execute, suspendable processes may be suspended, and throttleable processes may be throttled.

In one example of transitioning a computing environment into a connected standby state based upon power management classifications assigned to processes, an enter connected standby request associated with the computing environment may be detected (e.g., a user may invoke a standby button of a tablet device, a threshold period of inactivity may have passed, etc.). The computing environment may be transitioned into the connected standby state, for example, from an execution state. For example, for respective suspendable processes, a suspendable process may be placed into a non-executing suspended state (e.g., the suspendable process may be ineligible for execution, and thus may be unable to invoke hardware components to perform power consuming activity). For respective throttleable processes, a throttling schedule may be assigned and/or applied to a throttleable process (e.g., an email process may be allowed to execute for 5 seconds every 8 minutes to check for new messages, otherwise the email process may be in the non-executing suspended state to reduce power consumption). For respective exempt processes, an exempt process may be allowed to execute in an execution state (e.g., a network process may be allowed to execute to provide desired functionality, such as receipt of new emails). In one example, suspendable processes may be suspended before throttleable processes because suspendable processes may rely upon functionality from throttleable process, and thus a suspendable process may fail if a throttleable process enters a non-executing suspended state before the suspendable process is suspended (e.g., a suspendable online photo application may fail if an underlying network photo upload process is unavailable). In this way, the computing environment may be transitioned into the connected standby state to conserve power, while still providing desired functionality (e.g., notification of new messages).

In one example of transitioning a computing environment from a connected standby state to an execution state, an exit connected standby request associated with the computing environment may be detected (e.g., a user may attempt to interact with a tablet device with a finger touch action on a tablet screen). The computing environment may be transitioned from the connected standby state to the execution state based upon the exit connected standby request. For example, for respective suspended processes, execution functionality may be restored to a suspended process (e.g., an online photo application process may be available in a responsive manner, such as within seconds). For respective throttled processes, execution functionality may be restored to a throttled process (e.g., an email process in a non-executing suspended state based upon a throttling schedule may be transitioned into an execution state in a responsive manner). In this way, the computing environment may be transitioned into an up-to-date execution state in a responsive manner without a user waiting a significant amount of time for resumed functionality and/or up-to-date information.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
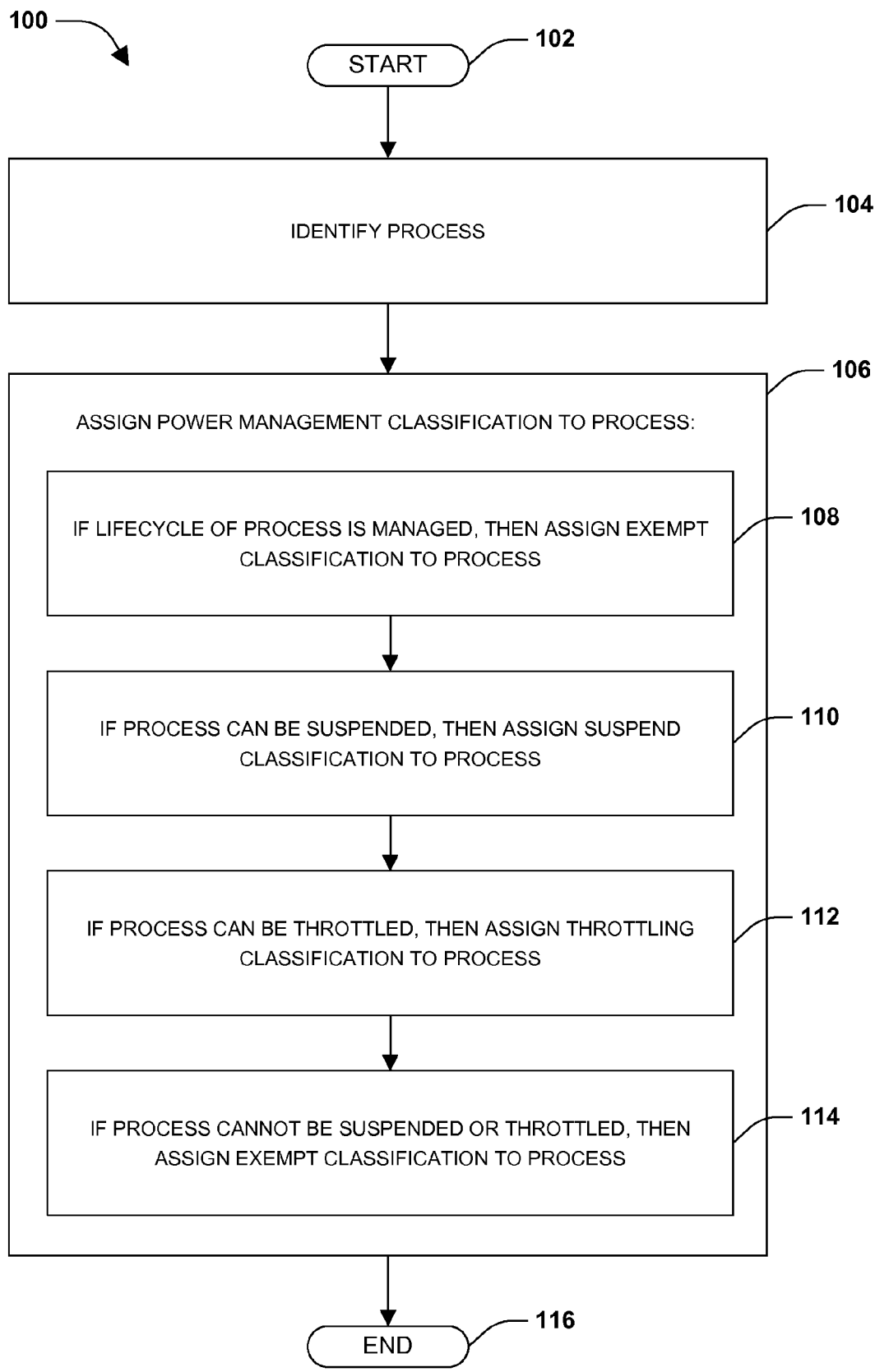
FIG. 1 is a flow chart illustrating an exemplary method of assigning a power management classification to a process.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many computing environments may incorporate power conservation techniques to mitigate power consumption and/or conserve battery life. For example, an operating system may provide a hibernation/sleep policy that may prevent the execution of applications, system processes, and/or processor functionality that may otherwise invoke computing resources to perform power consuming tasks. Unfortunately, many power conservation techniques may suspend processes that perform desirable functionality (e.g., a hibernation policy may not comprise functionality to selectively allow certain processes to execute during a hibernation state), and thus a computing environment may provide stale information upon awakening into an execution state (e.g., a computing environment awakening from a hibernation state may not provide up-to-date message information because a message functionality process may have been suspended during the hibernation state). Additionally, awakening from a hibernation/sleep state may take a considerable amount of time before the computing environment is fully responsive and/or able to provide up-to-date information. Thus, a balance between providing adequate power conservation and providing a user with a responsive and connected experience is desirable.

Accordingly, one or more systems and/or techniques for assigning power management classifications to a process associated with a computing environment, transitioning the computing environment into a connected standby state based upon power management classifications assigned to processes, and transitioning the computing environment from the connected standby state to an execution state are provided herein. In particular, processes may be classified with an exemption classification, a suspend classification, and/or a throttle classification based upon various factors, such as whether a process provides desired functionality and/or critical system functionality. In this way, the computing environment may be transitioned into a connected standby state, such as a low power consumption state that provides an always-on/always-connected experience. In particular, exempt processes may be allowed to execute, suspendable processes may be suspended from executing, and throttleable processes may be cycled between an execution state and a non-execution suspended state based upon a throttle schedule. Suspending and/or throttling processes may reduce power consumption because such processes may be placed into a non-executing suspended state that may restrict such processes from invoking resources to perform power consuming tasks. The computing environment may be transitioned from the connected standby state to an execution state in a responsive manner that provides an up-to-date experience for the user in a nominal amount of time (e.g., a user may be able to interact with an up-to-date state of the computing environment within seconds). In particular, suspended processes and/or throttled processes may be placed into an execution state so that the computing environment is transitioned into the execution state.

One embodiment of assigning a power management classification to a process is illustrated by an exemplary method 100 in FIG. 1. At 102, the method starts. At 104, a process for which a power management classification is to be assigned may be identified (e.g., a process within a computing environment, such as a tablet operating system, desktop operating system, mobile device operating system, etc.). For example, a newly created process may be identified as the process (e.g., a process within a logical container, such as a hierarchal job object). At 106, a power management classification may be assigned to the process. It may be appreciated that various factors may be evaluated to assign the power management classification (e.g., criticality of the process to system operation, desired functionality provided by the process, ability to throttle the process, etc.).

In one example of assigning the power management classification, a logical container of the process may be determined as being associated with a parent logical container of a parent process (e.g., a logical container of a spell checker process may be associated with (e.g., nested under) a parent logical container of a parent word processing process). A parent power management classification assigned to the parent process may be assigned to the process as the power management classification assigned to the process (e.g., a suspend classification assigned to the parent word processing process may also be assigned to the spell checker process so that both processes may be suspended together, as opposed to one process being suspended while the other process (e.g., spell checker) continues to needlessly execute during a connected standby state).

In another example of assigning the power management classification, if a lifecycle of the process is managed by the process and/or a lifecycle management component, then an exempt classification may be assigned to the process, at 108. For example, an application (e.g., a relatively newly created application) may be developed under an application model that provides for extensive power consumption management. Thus, the application may be assigned the exempt classification because additional power consumption management may be redundant and/or interfere with execution of the application.

In another example of assigning the power management classification, if the process can be suspended without a computing system failure (e.g., a failure of the computing environment and/or an application associated with the process) and limited runtime functionality associated with the process is not desired (e.g., a user may not desire print functionality when the computing environment is in a low power connected standby state), then the process may be assigned a suspend classification, at 110. For example, if the process is associated with a user application, then the process may be determined as being suspendable, and may be assigned the suspend classification (e.g., a photo sharing application initialized within a user session may not provide desired functionality for when the computing environment is in the low powered connected standby state (e.g., user does not desire to view/share photos when his/her tablet is in a connected standby state) and/or may not affect core system functionality of the computing environment).

In another example of assigning the power management classification, if the process can be throttled without the computing system failure and limited runtime functionality associated with the process is desired, then a throttling classification may be assigned to the process, at 112. For example, if the process comprises a service (e.g., a messaging system service initialized within a system session) that provides desired state functionality (e.g., the message system service may listen for new messages so that the user may be notified of up-to-date communication), then the process may be determined as being throttleable, and may be assigned the throttling classification (e.g., a process associated with anti-virus functionality, messaging service functionality, network service functionality, and/or a variety of other desired functionality may be assigned the throttling classification).

In another example of assigning the power management classification, if the process cannot be suspended or throttled without the computing system failure, then the exempt classification may be assigned to the process, at 114. It may be appreciated that the computing environment may rely upon a variety of processes for basic operational functionality, and thus suspension and/or throttling of such processes may result in the computing system failure. In one example, particular core kernel processes, device drivers, and/or other processes that provide basic operational functionality may be assigned the exempt classification. In another example, a dependency graph may be consulted. The dependency graph may have been built from a core kernel process to one or more support processes that provide functionality upon which the core kernel process depends (e.g., a software component network communication module that facilitates communication between distributed software components may be relied upon by one or more core kernel processes associated with such software components). If the process comprises a support process specified within the dependency graph, then the process may be determined as being unable to be suspended, and thus may be assigned the exempt classification.

In another example of assigning the power management classification, if the process provides functionality associated with a user defined policy, then a user defined power management classification may be assigned to the process. For example, a user may specify a desire for the computing environment to stay up-to-date with incoming messages (e.g., regardless of whether the computing environment is within the low power connected standby state or the execution state). Accordingly, processes that provide message functionality (e.g., a message listener process, a message notification process, etc.) may be assigned a user defined power management classification, such as the exempt classification. In this way, various processes may be assigned power management classifications that may be used to transition the computing environment into a connected standby state. At 116, the method ends.

Figure 2:
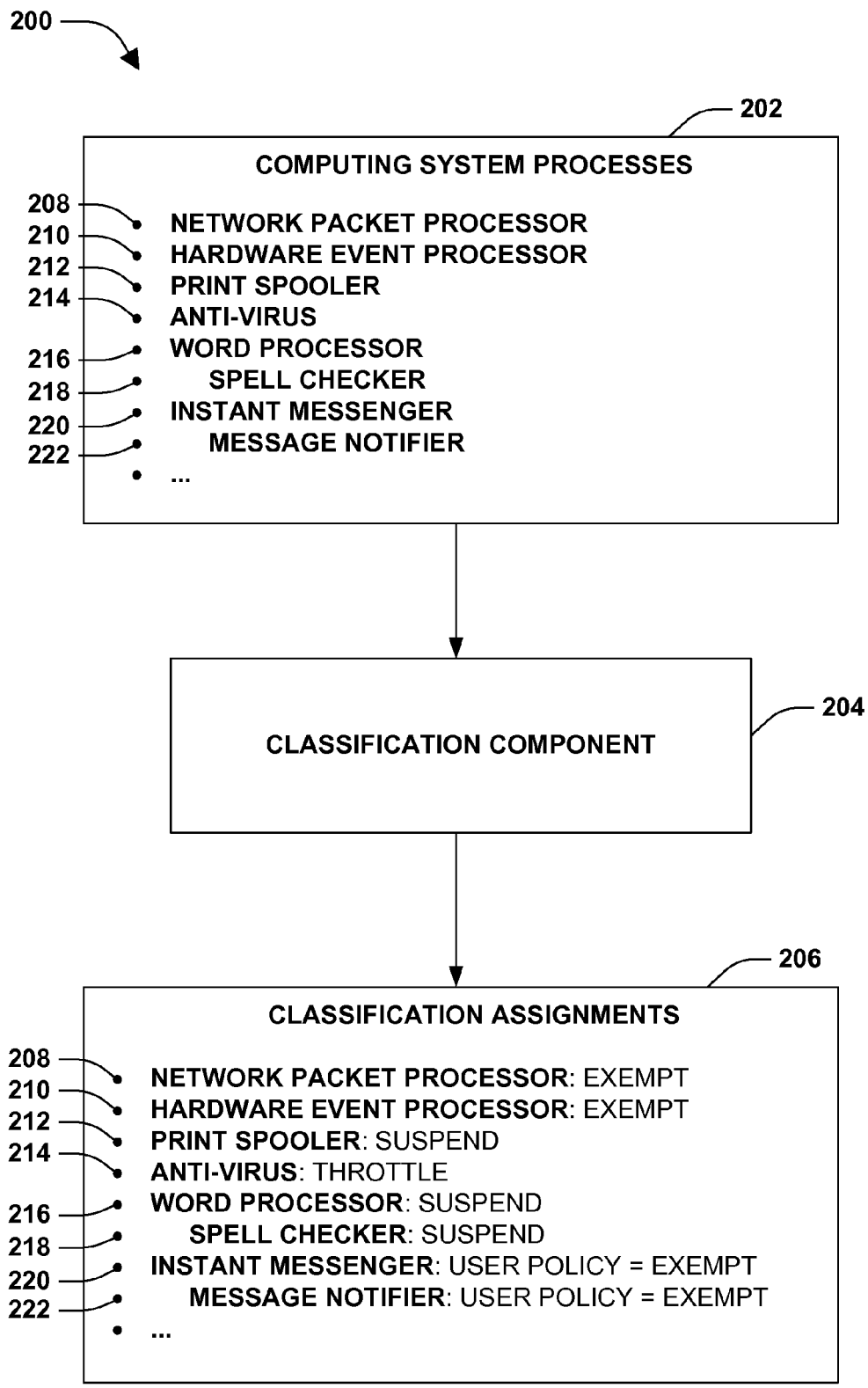
FIG. 2 is a component block diagram illustrating an exemplary system for assigning a power management classification to a process.

FIG. 2 illustrates an example of a system 200 configured to assign a power management classification to a process. System 200 may comprise a classification component 204. The classification component 204 may be configured to assign a power management classification to a process associated with a computing environment. For example, the computing environment may be associated with computing system processes 202 comprising a network packet processor 208, a hardware event processor 210, a print spooler 212, an anti-virus 214, a word processor 216, a spell checker 218 (e.g., the spell checker 218 may be child process of the word processor 216), an instant messenger 220, and/or a message notifier 222 (e.g., message notifier 222 may be a child process of instant messenger 220).

In one example, the classification component 204 may be configured to determine whether a process is associated with a parent process. If the process is associated with a parent process, then the classification component 204 may assign a parent power management classification assigned to the parent process as the power management classification assigned to the process. For example, word processor 216 may be a parent process of spell checker 218. Word processor 216 may have been assigned a suspend classification (e.g., word processor 216 may be associated with a word processor application that does not provide desired functionality during a low power connected standby state and/or does not provide critical system functionality). Accordingly, spell checker 218 may be assigned the suspend classification that was assigned to word processor 216. Similarly, message notifier 222 may be assigned a user power management classification of exempt assigned to instant messenger 220 because instant messenger 220 is a parent process of message notifier 222. In this way, associated processes may be classified similarly, so that such power management classification may be implemented as a group for efficiency (e.g., fewer classification operations need to be performed, further promoting power conservation) and/or to avoid inconsistent results (e.g., if message notifier 222 was assigned an exempt classification, then message notifier 222 may needlessly execute while instant messenger 220 is suspended during a connected standby state).

In another example, the classification component 204 may assign an exempt classification to the process based upon determining a lifecycle of the process is managed by the process and/or a lifecycle management component. That is, power conservation may already be managed by the process or another component.

In another example, the classification component 204 may assign a suspend classification to the process based upon determining the process can be suspended without a computing system failure and/or limited runtime functionality associated with the process is not desired. For example, word processor 216 may be assigned the suspend classification because the word processor 216 is a user application whose suspension may not create a computing system failure and/or a user may not desire limited runtime word processing functionality while the computing environment is within a connected standby state. Additionally, the printer spooler 212 may be assigned the suspend classification because suspension of the print spooler 212 may not create a computing system failure and/or the user may not desire limited runtime printing functionality while the computing environment is within the connected standby state.

In another example, the classification component 204 may assign a throttling classification to the process based upon determining the process can be throttled and limited runtime functionality associated with the process is desired. For example, anti-virus 214 (e.g., an anti-virus system service initialized within a system session) may provide desired state functionality because write access to storage, for example, may be blocked until the anti-virus 214 performs a check on data to be written (e.g., a user may desire for incoming messages to be saved to storage while the computing environment is within the connected standby state).

In another example, the classification component 204 may assign the exempt classification to the process based upon determining the process cannot be suspended or throttled without a computing system failure. In one example, the classification component 204 may determine that particular core kernel processes, device drivers, and/or other processes cannot be suspended without a computing system failure. For example, network packet processor 208 and/or hardware event processor 210 may provide core functionality relied upon by the computing environment, and thus may be assigned the exempt classification. In another example, a dependency graph may be consulted to determine whether the process is a support process upon which a core kernel process depends.

In another example, the classification component 204 may assign a user defined power management classification to the process based upon determining the process provides functionality associated with a user defined policy. For example, instant messenger may be assigned a user power management classification of exempt because the user may desire to receive incoming instant messages even if the computing environment is within a connected standby state.

In this way, power management classification assignments 206 may be created and/or updated with assignments of power management classifications to processes. Such assignments may be utilized in transitioning the computing environment into a connected standby state to achieve a low powered state that may reduce power consumption and/or improve battery life. It may be appreciated that such assignments may be utilized for a variety of other scenarios, such as background/foreground task suspension and/or throttling of processes while in an execution state.

Figure 3:
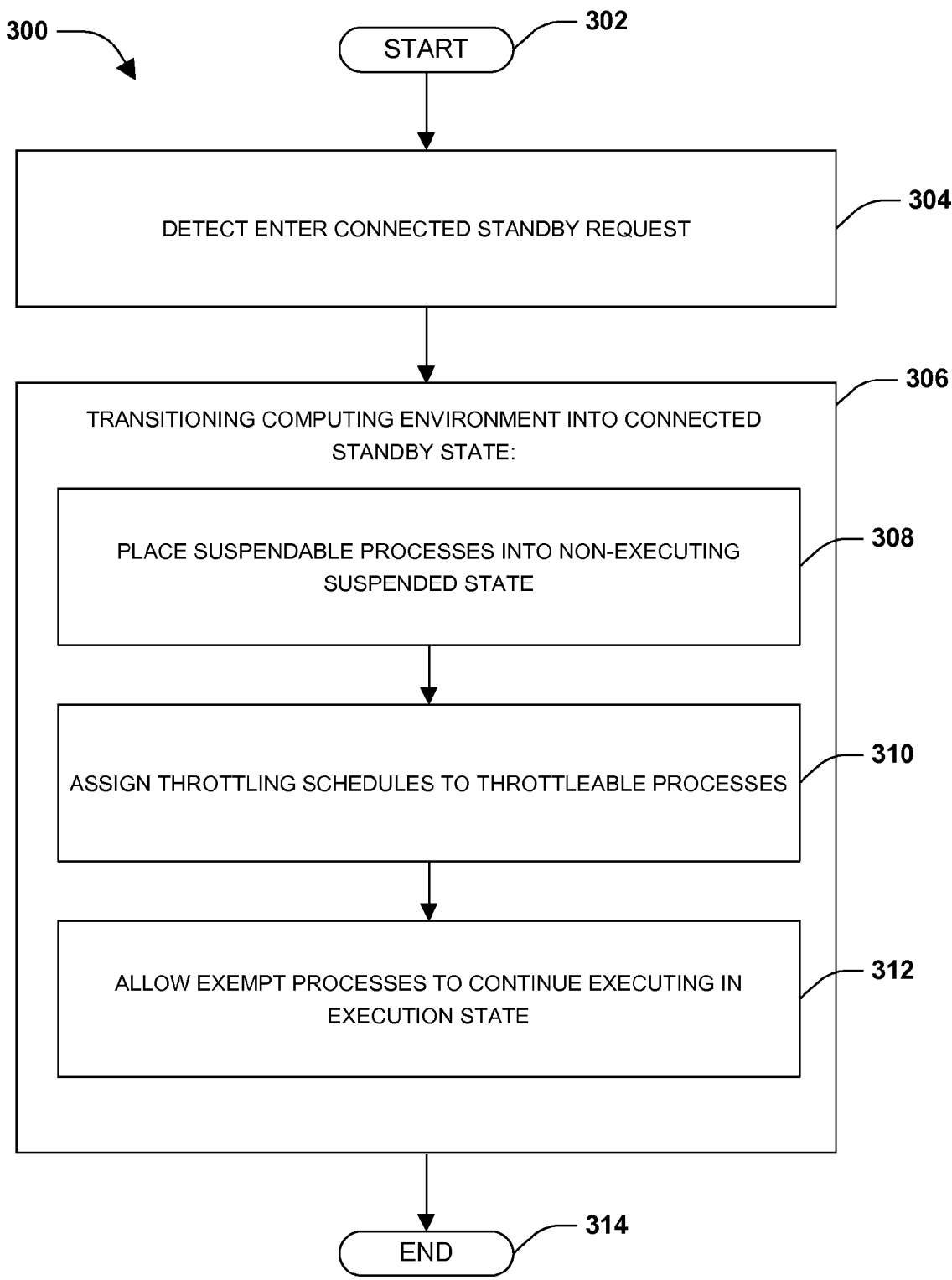
FIG. 3 is a flow chart illustrating an exemplary method of transitioning a computing environment into a connected standby state based upon power management classifications assigned to processes.

One embodiment of transitioning a computing environment into a connected standby state based upon power management classifications assigned to processes is illustrated by an exemplary method 300 in FIG. 3. At 302, the method starts. At 304, an enter connected standby request associated with the computing environment may be detected. It may be appreciated that a connected standby state may correspond to a low power consumption state, where various processes may be suspended, throttled, or allowed to continue execution. In this way, power consumption may be reduced and the computing environment may continue executing desired functionality to provide a responsive and up-to-date experience when transitioning (back) into an execution state. The connected standby state may be implemented in a variety of ways on various computing devices, such as tablet computing devices, desktop computing devices, laptops, mobile phones, etc.

At 306, the computing environment may be transitioned into the connected standby state. In one example, for respective suspendable processes assigned a suspend classification, a suspendable process may be placed into a non-executing suspended state, at 308. That is, the suspendable process may be prevented from invoking resources to perform power consuming tasks (e.g., a word processor may be suspended so that the word processor does not access hardware resources that may otherwise be in a low-power idle state). The suspend classification may correspond to whether a process is able to be suspended without a computing system failure and/or whether limited runtime functionality associated with the process is not desired. In this way, suspendable processes may be placed into the non-executing suspended state without creating computer system failures and/or losing desired functionality.

In another example, for respective throttleable processes assigned a throttling classification, a throttling schedule may be assigned to a throttleable process, at 310. The throttling classification may correspond to whether a process can be throttled without a computing system failure and/or whether limited runtime functionality associated with the process is desired. The throttling schedule may be applied to the throttleable process while in the connected standby state. For example, the throttleable process may be cycled between the execution state and the non-executing suspended state based upon the throttling schedule (e.g., the throttling schedule may specify an execution time period for the executing state and a suspended time period for the non-executing suspended state). For example, a throttleable message process may be allowed 20 seconds of execution to check for new messages every 5 minutes.

In another example, for respective exempt processes assigned an exempt classification, an exempt process may be allowed to continue executing in an execution state, at 312. The exempt classification may correspond to whether a process cannot be suspend or throttled without a computing system failure (e.g., a core kernel process, a device driver, and/or support processes for core kernel processes, etc.). In this way, exempt processes that provide core functionality for the computing environment and/or provide desired functionality may be allowed to execute in the execution state while the computing environment is within the connected standby state.

In one example of transitioning the computing environment into the connected standby state, suspendable processes may be placed into the non-executing suspended state before throttleable processes are throttled. Because suspendable processes may rely upon throttleable processes (e.g., a suspendable word processor application may rely upon a throttleable storage access process for access to stored text documents). Suspending before throttling may mitigate instances where a suspendable process may fail because a throttled process, upon which the suspendable process relies, may have already been placed into the non-executing suspended state before suspension of the suspendable process.

In one example of transitioning the computing environment into the connected standby state, a group of suspendable processes associated with one another may be suspended, which may mitigate compatibility risks, for example. In one example, a first suspendable process may be grouped with a second suspendable process because the first suspendable process may consume a resource associated with the second suspendable resource (e.g., a word processor application process may consume spell check data from a spell checker process, and thus the processes may be grouped together). In another example, the first suspendable process may be grouped with the second suspendable process because the first suspendable process may be a child process of the second suspendable process (e.g., a photo uploading process may be a child process of an online photo sharing process, and thus the processes may be grouped together). In another example, the first suspendable process may be grouped with a second suspendable process because the first suspendable process may have been initialized within a first logical container associated with a second logical container within which the second suspendable process was initialized (e.g., the online photo sharing process may have been initialized within a parent job group, and the photo uploading process may have been initialized within a child job group nested within the parent job group, and thus the processes may be grouped together). In this way, suspendable processes that may be associated with one another and/or depend upon one another may be grouped together for suspension as a group.

While in the connected standby state, a process within an execution state may create a new process. Upon creation, the new process may be classified with a power management classification. That is, a power management classification may be applied to a new process even though the computing environment may already be within the connected standby state.

In this way, the computing environment may be transitioned into the connected standby state to reduce power usage. It may be appreciated that additional power saving techniques may be implemented, such as turning off unnecessary hardware and/or resources, such as powering off a screen of a computing device associated with the computing environment. At 314, the method ends.

Figure 4:
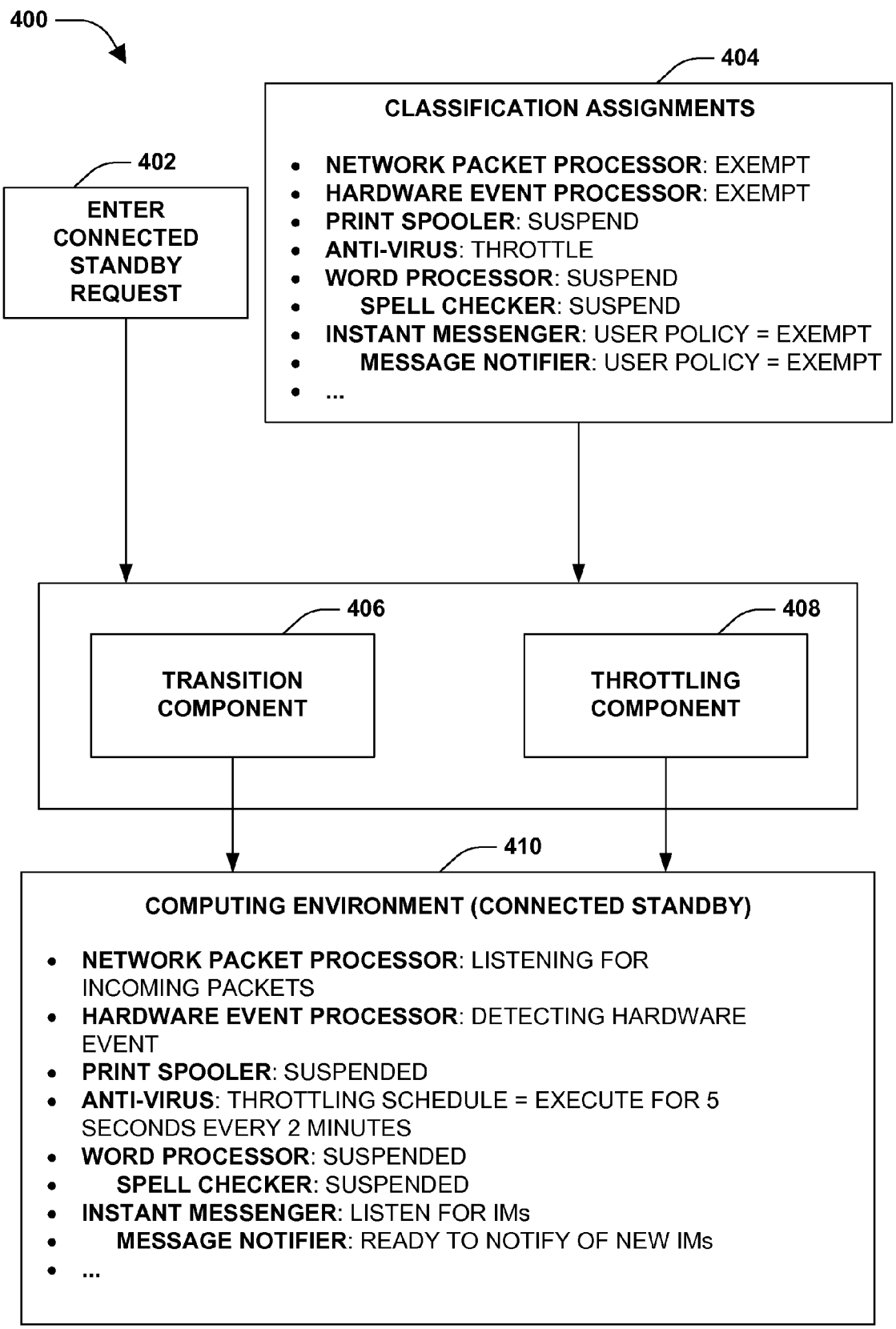
FIG. 4 is a component block diagram illustrating an exemplary system for transitioning a computing environment into a connected standby state based upon power management classifications assigned to processes.

FIG. 4 illustrates an example of a system 400 configured to transition a computing environment into a connected standby state 410 based upon power management classification assignments 404 assigned to processes. System 400 may comprise a transition component 406 and/or a throttling component 408. The transition component 406 may be configured to detect an enter connected standby request 402 associated with the computing environment. The transition component 406 may be configured to transition the computing environment into the connected standby state 410, which may reduce power consumption associated with a computing device hosting the computing environment (e.g., one or more processes may be suspended and/or throttled to reduce power consumption associated with such processes).

For respective suspendable processes assigned a suspend classification within the power management classification assignments 404, the transition component 402 may be configured to place a suspendable process into a non-executing suspended state. For example, a print spooler process, a word processor process, a spell checker process, and/or other suspendable processes may be placed into the non-executing suspended state while the computing environment is within the connected standby state 410. In one example, a group of suspendable processes associated with one another may be suspended together (e.g., a first suspendable process may be associated with a second suspendable process based upon at least one of the first suspendable process being a child process of the second suspendable process, the first suspendable process consuming a resource from the second suspendable process, and/or the first suspendable process waiting for a resource locked by the second suspendable process). For example, the word processor process and the spell checker process may be suspended together to mitigate compatibility risks that may occur if one process is suspended while the other is left executing for a period of time (e.g., the word processor process may consume data from the spell checker process, and may fail if the spell checker process is suspended before the word processor process).

For respective throttleable processes assigned a throttling classification within the power management classification assignments 404, the transition component 406 may assign a throttling schedule to a throttleable process. For example, an anti-virus process may be assigned a throttling schedule, where the anti-virus process may execute for 5 seconds every 2 minutes. The throttling component 408 may be configured to apply the throttling schedule to the throttleable process by cycling the throttleable process between the execution state and the non-executing suspended state based upon the throttling schedule. In one example, the transition component 406 may be configured to place suspendable processes into the non-executing suspended state before assigning the throttling schedule to the throttleable processes and/or before the throttling component 408 applies the throttling schedules. Suspending processes before throttling processes may mitigate conflicts where a suspendable process relies upon data from a throttleable process, but the throttleable process is already in a non-executing suspended state before the suspendable process is suspended.

For respective exempt processes assigned an exempt classification within the power management classifications assignments 404, the transition component 406 may allow an exempt process to continue executing. For example, a network packet processor process, a hardware event processor process, an instant messenger process, a message notifier process, and/or other exempt processes may be allowed to continue executing while the computing environment is within the connected standby state 410 (e.g., the network packet processor process and/or the hardware event processor process may be exempt because such functionality may be relied upon by the computing environment for basic functioning, while the instant messenger process and the message notifier process may be exempt because such functionality may be desirable to a user). In this way, the computing environment may be transitioned by the transition component 406 into the connected standby state 410.

Figure 5:
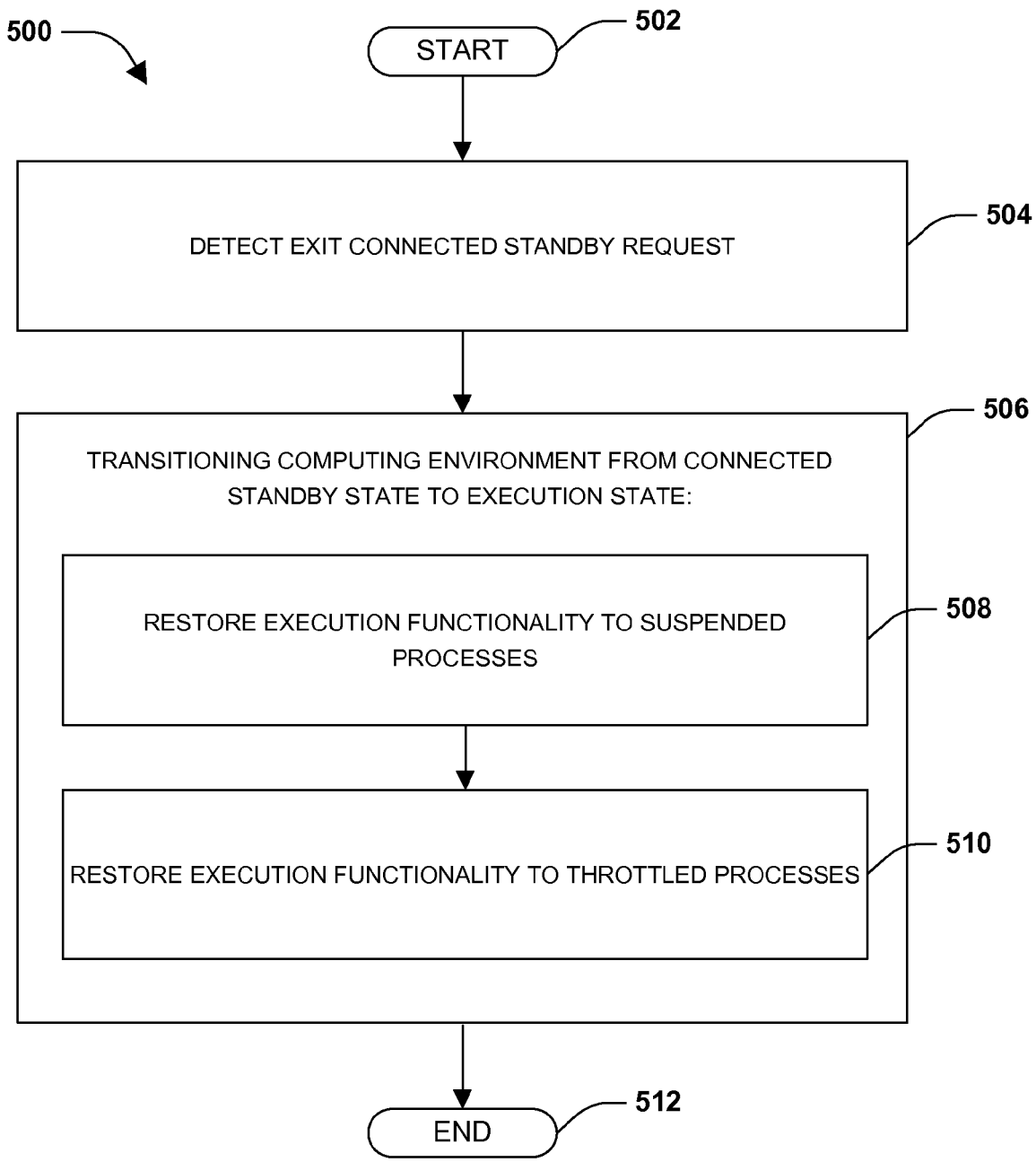
FIG. 5 is a flow chart illustrating an exemplary method of transitioning a computing environment from a connected standby state to an execution state.

One embodiment of transitioning a computing environment from a connected standby state to an execution state is illustrated by an exemplary method 500 in FIG. 5. At 502, the method starts. At 504, an exit connected standby request associated with the computing environment may be received. That is, the computing environment may have been transitioned into the connected standby state to reduce power consumption. For example, while in the connected standby state, one or more processes may have been suspended and/or throttled to reduce power consumption, while processes relied upon for basic operation of the computing environment and/or processes that provide desired functionality may have been allowed to execute so that the computing environment may seamlessly transition into an up-to-date execution state in a responsive manner (e.g., a tablet device that was in connected standby for hours may be transitioned within seconds into an execution state, where email messages and other information may be up-to-date and/or accessible within seconds for the user).

At 506, the computing environment may be transitioned from a connected standby state to an execution state. In one example, for respective suspended processes assigned a suspend classification, execution functionality may be restored to a suspended process, at 508. The suspend classification may correspond to whether a process is able to be suspended without a computing system failure (e.g., failure of the computing environment and/or the process) and/or whether limited runtime functionality associated with the process is not desired (e.g., a word processing user application created within a user session may have been suspended because functionality of the word processing user application while the computing environment is within the connected standby state may not be desired and/or such functionality may not be relied upon for basic operation by the computing environment).

In another example, for respective throttled processes assigned a throttling classification, execution functionality may be restored to a throttled process, at 510. For example, execution functionality to the throttled process may be based upon a throttling schedule applied to the throttled process, and the throttling schedule may be unapplied to the throttled process as part of restoring execution functionality to that process (e.g., if the throttled process is in a non-executing suspended state, then the throttled process may be transitioned into an executing state). The throttling classification may correspond to whether a process can be throttled without a computing system failure and/or whether limited runtime functionality associated with the process is desired (e.g., an anti-virus process may have been assigned a throttling classification because the anti-virus process provides desired state functionality of scanning data before the data is written to storage and throttling the anti-virus process may not create a failure of the anti-virus process and/or the computing environment).

In one example of transitioning from the connected standby state to the execution state, execution functionality may be restored to throttled processes before execution functionality is restored to suspended processes (e.g., 510 and then 508 even though FIG. 5 illustrates 508 before 510) because the suspended processes may rely upon data and/or functionality provided by the throttled processes. For example, execution functionality may be restored to a throttled storage access process before a suspended photo editing process because the suspended photo editing process may crash if the throttled storage access process is not available to provide the suspended photo editing process with access to storage. In another example, execution functionality may be restored to a parent suspended process before a child suspended process because the child suspended process may be configured to consume a resource from the parent suspended process. In this way, the computing environment may be transitioned from the connected standby state into the execution state in a responsive manner, which may provide a user with up-to-date information without undue delay (e.g., a user may be able to view new messages within seconds of submitting the exit connected standby request). At 512, the method ends.

Figure 6:
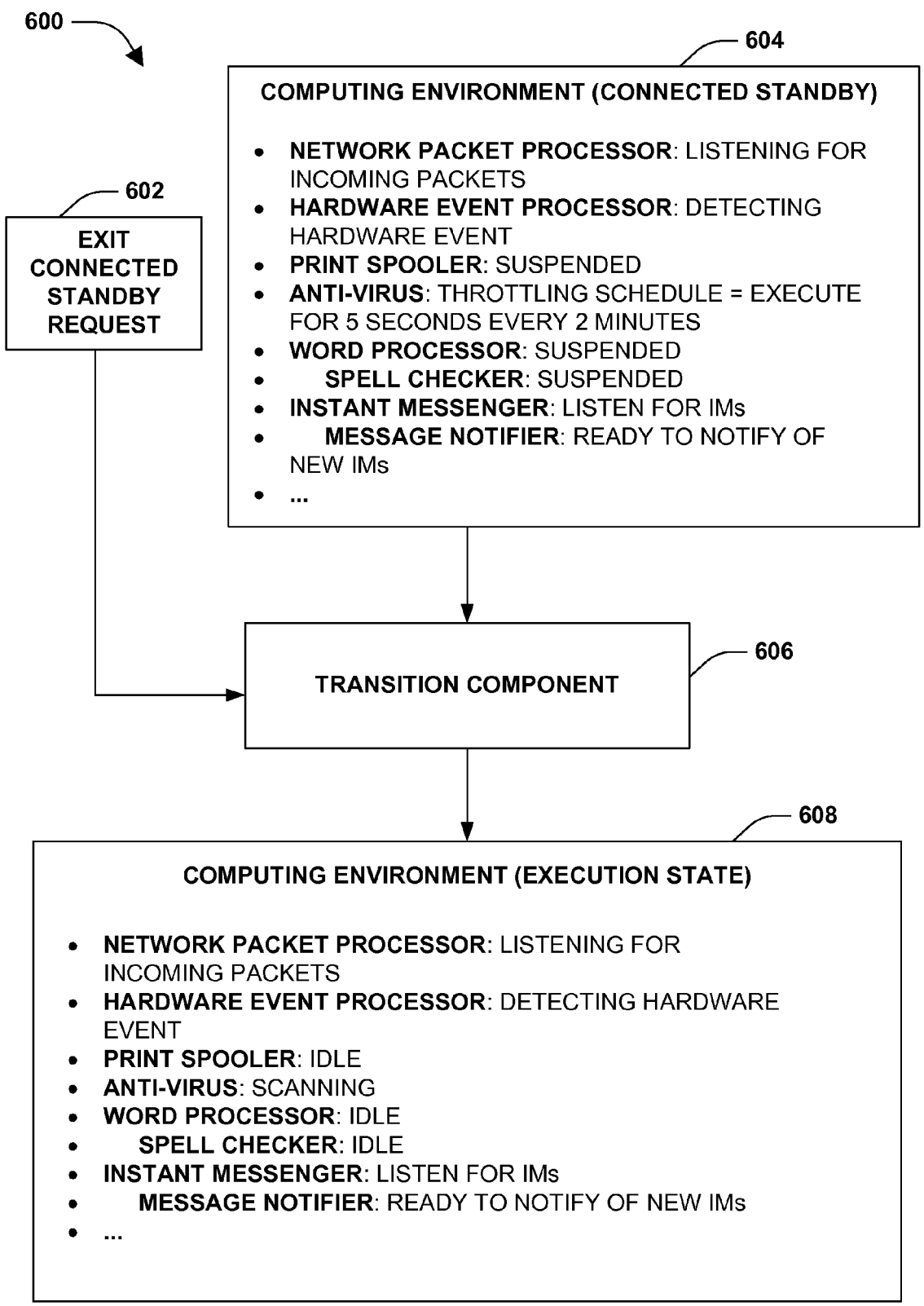
FIG. 6 is a component block diagram illustrating an exemplary system for transitioning a computing environment from a connected standby state to an execution state.

FIG. 6 illustrates an example of a system 600 configured to transition a computing environment from a connected standby state 604 to an execution state 608. System 600 may comprise a transition component 606. The transition component 606 may be configured to detect an exit connected standby request 602 associated with the computing environment (e.g., user swipe across a tablet screen). The transition component 606 may be configured to transition the computing environment from the connected standby state 604 to the execution state 608.

For respective suspended processes assigned a suspend classification, the transition component 606 may restore execution functionality to a suspended process. For example, a print spooler process, a word processor process, a spell checker process, and/or other processes may have been suspended while the computing environment was in the connected standby state 604, which may have reduced power consumption. Upon restoring execution functionality, such processes may execute as normal while the computing environment is in the execution state 608.

For respective throttled processes assigned a throttling classification, the transition component 606 may restore execution functionality to a throttled process. For example, an anti-virus process may have been throttled based upon a throttling schedule while the computing environment was in the connected standby state 604 because the anti-virus process may have provided desirable limited runtime functionality (e.g., the anti-virus process may have checked data associated with write commands to storage at various intervals so that incoming messages may be written to storage and/or available to the user upon the computing environment transitioning into the execution state 608). In one example, execution functionality may be restored by unapplying the throttling schedule that was applied to the throttled process (e.g., if the throttled process is in a non-executing suspended state, then the throttled process may be transitioned into an executing state).

In one example, the transition component 606 may be configured to restore execution functionality to the throttled process before restoring execution functionality to the suspended process because the suspended process may consume a resource from the throttled process. For example, execution functionality may be restored to a throttled storage access process before a suspended photo editing process because the suspended photo editing process may crash if the throttled storage access process is not available to provide the suspended photo editing process with access to storage. In another example, execution functionality may be restored to a parent suspended process before execution functionality is restored to a child suspended process because the child suspended process may consume a resource from the parent suspended process.

It may be appreciated that one or more exempt processes may have been allowed to execute within an execution state while the computing environment was in the connected standby state 604 (e.g., a network packet processor process, a hardware event processor process, an instant messenger process, a message notifier process, and/or other processes may have been allowed to execute). Thus, such processes may be allowed to continue processing when the computing environment transitions into the execution state 608. In this way, the computing environment may be seamlessly transitioned from the connected standby state 604 into the execution state 608 by the transition component 606 in a responsive manner, which may provide a user with up-to-date information without undue delay (e.g., a user may be able to view new messages within seconds of submitting the exit connected standby request 602).

Figure 7:
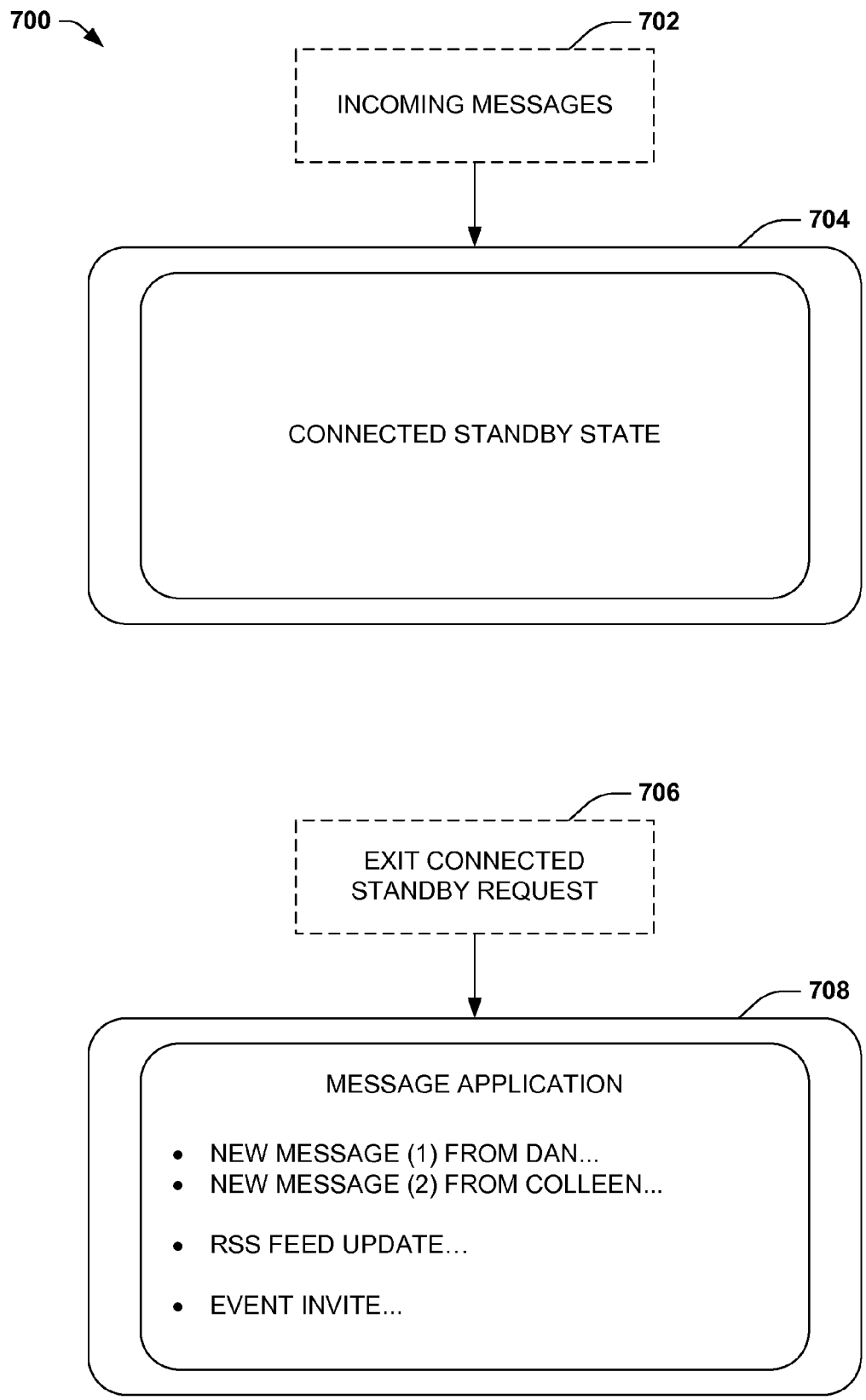
FIG. 7 is an illustration of an example of a tablet device transitioning from a connected standby state to an execution state.

FIG. 7 illustrates an example 700 of a tablet device transitioning from a connected standby state 704 to an execution state 708. The tablet device may have entered connected standby state 704 to reduce power consumption by allowing some processes to execute, while throttling and/or suspending other processes. For example, core system processes relied upon by the tablet device for basic operation and/or other processes that cannot be throttled or suspended without causing a computing system failure may be allowed to execute in a normal manner. System service processes and/or other processes that can be throttled without creating a computing system failure (e.g., failure of a process and/or the tablet device) and/or provide desired limited runtime functionality may be throttled. Throttling a process may conserve power because the throttled process may be placed into a non-executing suspended state for significant periods of time. Thus, the throttled process in the non-executing suspended state may not invoke resources (e.g., a processor, hardware, etc.) to perform power consuming functionality. Additionally, processes that can be suspended without creating a computing system failure and/or do not provide desired limited runtime functionality may be suspended. Suspending a process may conserve power because the suspended process may be placed into the non-executing suspended state so that the suspended process may not invoke resources to perform power consuming functionality. In one example of the connected standby state 704, a network functionality process, a messaging service process, and/or other processes may be throttled and/or allowed to fully execute. Accordingly, the tablet device in the connected standby state 704 may continue to receive and/or process incoming messages 702. In this way, the tablet device may operate in a low power consumption state, while continuing to provide desired functionality.

The tablet device may be transitioned into the execution state 708. For example, user input corresponding to an exit connected standby request 706 may be received (e.g., a finger swipe on the tablet device may be detected). The tablet device may be seamlessly transitioned into the execution state 708 by placing throttled and/or suspended processes into an execution state. Because at least some functionality was allowed to execute while the tablet device was in the connected standby state 704, up-to-date information may be provided and/or available to the user in a responsive manner. For example, within short time span (e.g., a few seconds) of inputting the exit connected standby request 706, the user may be presented with up-to-date information associated with the incoming messages 702 processed while the tablet device was in the connected standby state 704. For example, new messages, RSS feed updates, event invites, and/or a plethora of other information may be available to the user upon the tablet device transitioning into the execution state. Thus, the tablet device may provide significantly improved battery life because of the connected standby state, while still providing the user with a responsive and up-to-date experience while in the execution state.

Figure 8:
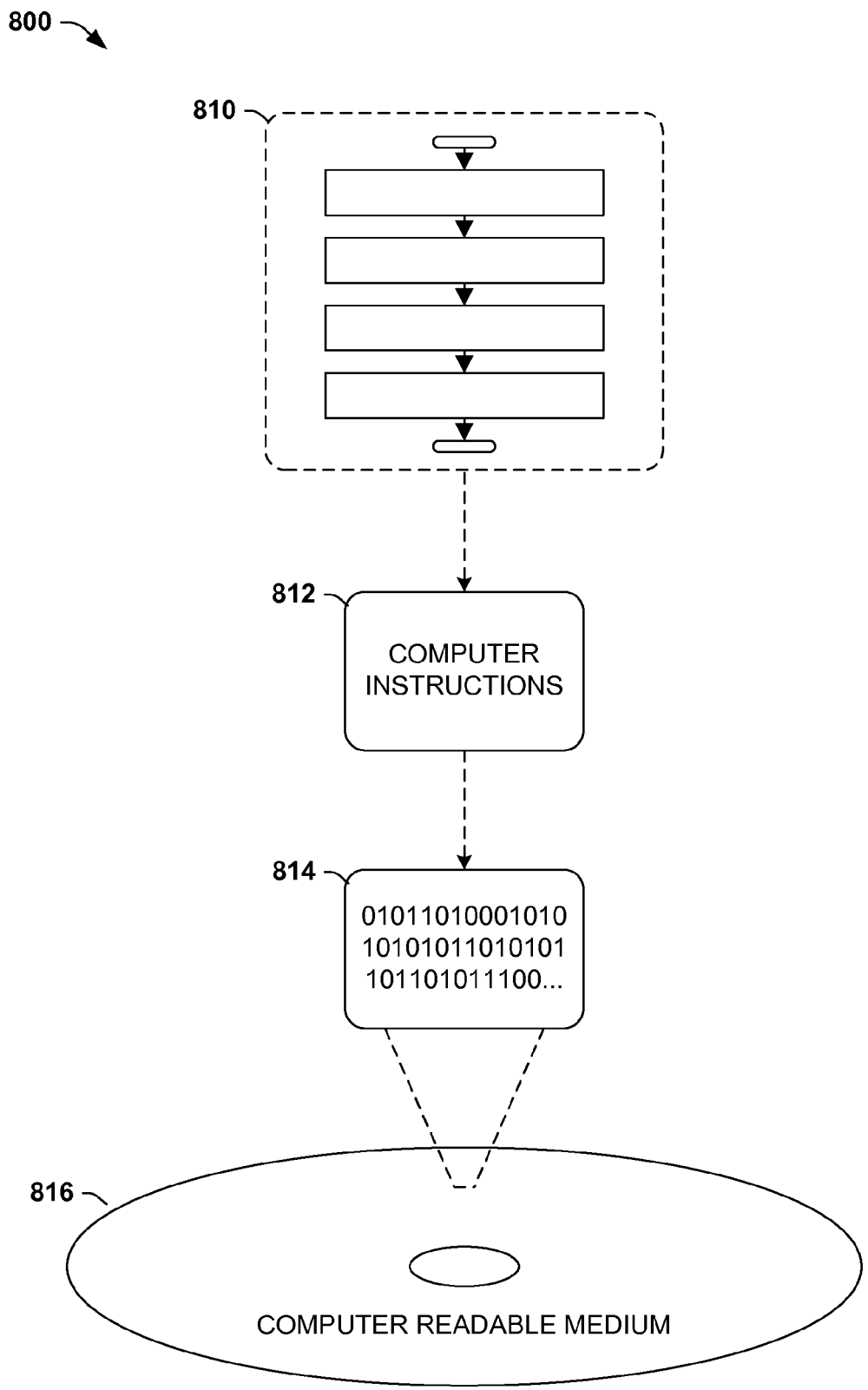
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as at least some of the exemplary method 100 of FIG. 1, exemplary method 300 of FIG. 3, and/or exemplary method 500 of FIG. 5, for example. In another such embodiment, the processor-executable instructions 812 may be configured to implement a system, such as at least some of the exemplary system 200 of FIG. 2, exemplary system 400 of FIG. 4, and/or exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 9:
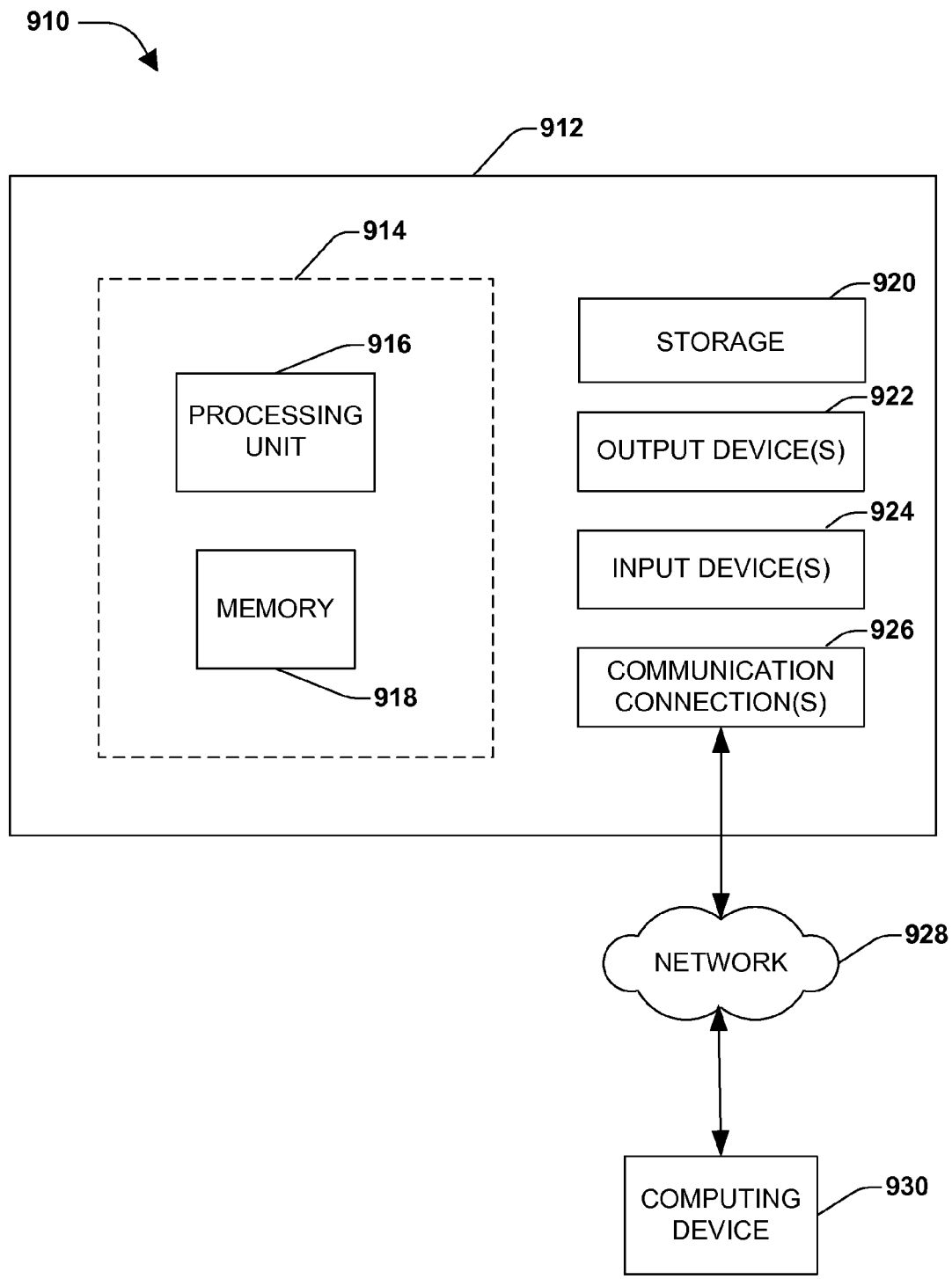
FIG. 9 illustrates an exemplary computing environment wherein one or more of the provisions set forth herein may be implemented.

FIG. 9 illustrates an example of a system 910 comprising a computing device 912 configured to implement one or more embodiments provided herein. In one configuration, computing device 912 includes at least one processing unit 916 and memory 919. Depending on the exact configuration and type of computing device, memory 919 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 919 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 919 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 919 may be comprised of multiple physical memory units located in different physical locations interconnected by a network.

Those skilled in the art will realize that storage devices utilized to store computer readable instructions may be distributed across a network. For example, a computing device 930 accessible via a network 929 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for transitioning into a connected standby state based upon power management classifications assigned to processes, comprising:
    detecting an enter connected standby request associated with a computing environment;
    transitioning the computing environment into a connected standby state, comprising:
        for respective suspendable processes assigned a suspend classification, placing a suspendable process into a non-executing suspended state;
        for respective throttleable processes assigned a throttling classification, assigning a throttling schedule to a throttleable process; and
        for respective exempt processes assigned an exempt classification, allowing an exempt process to continue executing in an execution state;
        while in the connected standby state, cycling the throttleable process between the execution state and the non-executing suspended state based upon the throttling schedule, the throttling schedule specifying an execution time period associated with the execution state and a suspended time period associated with the non-executing suspended state, the computing environment comprising a first throttleable process and at least one of a first suspendable process or a first exempt process;
    determining the first suspendable process is associated with a second suspendable process based upon at least one of determining the first suspendable process consumes a resource associated with the second suspendable process or the first suspendable process being a child process of the second suspendable process; and
    at least one of placing the second suspendable process into the non-executing suspended state when placing the first suspendable process into the non-executing suspended state or placing the first suspendable process into the non-executing suspended state when placing the second suspendable process into the non-executing suspended state.

2. The method of claim 1, the throttleable process comprising a process associated with an application having a managed lifecycle.

3. The method of claim 1, the first suspendable process comprising a photo uploading process, the second suspendable process comprising an online photo sharing process.

4. The method of claim 1, the throttleable process comprising at least one of a messaging functionality process, an antivirus process, or an email functionality process.

5. The method of claim 1, the transitioning the computing environment into a connected standby state, comprising:
    placing the suspendable process into the non-executing suspended state before assigning the throttling schedule to the throttleable process.

6. The method of claim 1, at least one of the first suspendable process or the second suspendable process comprising a word processing process.

7. The method of claim 1, at least one of the first suspendable process the same as the suspendable process or the second suspendable process the same as the suspendable process.

8. The method of claim 1, the first suspendable process different than the suspendable process, the first suspendable process different than the second suspendable process and the second suspendable process different than the suspendable process.

9. The method of claim 1, the first exempt process corresponding to the exempt process.

10. The method of claim 1, comprising:
    while in the connected standby state, classifying a newly created process with a new power management classification, and implementing the new power management classification.

11. The method of claim 1, comprising:
    while in the connected standby state, powering off a screen of a computing device associated with the computing environment.

12. The method of claim 1, the suspend classification corresponding to:
    whether a process is able to be suspended without a computing system failure and limited runtime functionality associated with the process is not desired.

13. The method of claim 1, the throttling classification corresponding to:
   whether a process can be throttled without a computing system failure and limited runtime functionality associated with the process is desired.

14. The method of claim 1, the exempt classification corresponding to:
   whether a process cannot be suspended or throttled without a computing system failure.

15. The method of claim 1, the exempt process comprising at least one of a core kernel process, a device driver, or a support process for a core kernel process.

16. A system for transitioning into a connected standby state based upon power management classifications assigned to processes, comprising:
   one or more processing units; and
   memory comprising instructions that when executed by at least one of the one or more processing units implement;
   a transition component configured to:
      detect an enter connected standby request associated with a computing environment;
      transition the computing environment into a connected standby state, comprising:
         for respective suspendable processes assigned a suspend classification, place a suspendable process into a non-executing suspended state;
         for respective throttleable processes assigned a throttling classification, assign a throttling schedule to a throttleable process; and
         for respective exempt processes assigned an exempt classification, allow an exempt process to continue executing in an execution state;
      determine a first suspendable process is associated with a second suspendable process based upon at least one of determining the first suspendable process consumes a resource associated with the second suspendable process or the first suspendable process being a child process of the second suspendable process; and
      at least one of place the second suspendable process into the non-executing suspended state when placing the first suspendable process into the non-executing suspended state or place the first suspendable process into the non-executing suspended state when placing the second suspendable process into the non-executing suspended state.

17. The system of claim 16, the instructions, when executed, implementing:
   a throttling component configured to:
   while in the connected standby state, cycle the throttleable process between the execution state and the non-executing suspended state based upon the throttling schedule, the throttling schedule specifying an execution time period associated with the execution state and a suspended time period associated with the non-executing suspended state, the computing environment comprising a first throttleable process and at least one of the first suspendable process or a first exempt process.

18. The system of claim 16, at least one of the first suspendable process the same as the suspendable process or the second suspendable process the same as the suspendable process.

19. The system of claim 16, the transition component configured to:
   place the suspendable process into the non-executing suspended state before assigning the throttling schedule to the throttleable process.

20. A computer readable memory comprising instructions that when executed perform a method for transitioning into a connected standby state based upon power management classifications assigned to processes, comprising:
   detecting an enter connected standby request associated with a computing environment;
   transitioning the computing environment into a connected standby state, comprising:
      for respective suspendable processes assigned a suspend classification, placing a suspendable process into a non-executing suspended state;
      for respective throttleable processes assigned a throttling classification, assigning a throttling schedule to a throttleable process; and
      for respective exempt processes assigned an exempt classification, allowing an exempt process to continue executing in an execution state; and
   determining a first suspendable process is associated with a second suspendable process based upon at least one of determining the first suspendable process consumes a resource associated with the second suspendable process or the first suspendable process being a child process of the second suspendable process; and
   at least one of placing the second suspendable process into the non-executing suspended state when placing the first suspendable process into the non-executing suspended state or placing the first suspendable process into the non-executing suspended state when placing the second suspendable process into the non-executing suspended state.

* * * * *